(12) United States Patent
Horiuchi et al.

(10) Patent No.: US 11,254,798 B2
(45) Date of Patent: Feb. 22, 2022

(54) ONE-PACK TYPE ADHESIVE AND FUEL CELL SEPARATOR

(71) Applicant: NISSHINBO CHEMICAL INC., Tokyo (JP)

(72) Inventors: Ayumi Horiuchi, Chiba (JP); Norimasa Nakamura, Chiba (JP)

(73) Assignee: NISSHINBO CHEMICAL INC., Tokyo (JP)

(*) Notice: Subject to any disclaimer, the term of this patent is extended or adjusted under 35 U.S.C. 154(b) by 122 days.

(21) Appl. No.: 16/636,406

(22) PCT Filed: Aug. 9, 2018

(86) PCT No.: PCT/JP2018/029927
§ 371 (c)(1),
(2) Date: Feb. 4, 2020

(87) PCT Pub. No.: WO2019/031585
PCT Pub. Date: Feb. 14, 2019

(65) Prior Publication Data
US 2020/0172697 A1   Jun. 4, 2020

(30) Foreign Application Priority Data
Aug. 10, 2017   (JP) .............................. JP2017-154898

(51) Int. Cl.
| | | |
|---|---|---|
| *C08K 3/013* | (2018.01) | |
| *C08K 3/36* | (2006.01) | |
| *C08L 63/10* | (2006.01) | |
| *H01M 8/0202* | (2016.01) | |
| *H01M 8/1004* | (2016.01) | |
| *B29C 65/48* | (2006.01) | |
| *H01M 8/00* | (2016.01) | |
| *H01M 4/86* | (2006.01) | |

(52) U.S. Cl.
CPC .............. *C08K 3/013* (2018.01); *B29C 65/48* (2013.01); *B29C 65/483* (2013.01); *B29C 65/4835* (2013.01); *B29C 65/4865* (2013.01); *C08K 3/36* (2013.01); *C08L 63/10* (2013.01); *H01M 4/86* (2013.01); *H01M 8/00* (2013.01); *H01M 8/0202* (2013.01); *H01M 8/1004* (2013.01)

(58) Field of Classification Search
CPC ........... C08K 3/013; C08K 3/36; C08L 63/10; B29C 65/48; B29C 65/483; B29C 65/4835; B29C 65/4865; H01M 4/86; H01M 8/00; H01M 8/0202; H01M 8/1004
See application file for complete search history.

(56) References Cited

U.S. PATENT DOCUMENTS

| | | | |
|---|---|---|---|
| 2003/0235750 A1 | 12/2003 | Tanno | |
| 2005/0241756 A1* | 11/2005 | Harthcock | ................ C09J 5/06 |
| | | | 156/305 |

FOREIGN PATENT DOCUMENTS

| | | |
|---|---|---|
| JP | 2001-216976 A | 8/2001 |
| JP | 2004-31008 A | 1/2004 |
| JP | 2012-199204 A | 10/2012 |
| JP | 2013-72011 A | 4/2013 |
| JP | 2014-51621 A | 3/2014 |
| JP | 2016-130287 A | 7/2016 |

OTHER PUBLICATIONS

International Search Report dated Oct. 23, 2018, issued in counterpart International Application No. PCT/JP2018/029927 (2 pages).

* cited by examiner

*Primary Examiner* — Helen Oi K Conley
(74) *Attorney, Agent, or Firm* — Westerman, Hattori, Daniels & Adrian, LLP

(57) ABSTRACT

Provided is a one-pack type adhesive which contains (A) an epoxy resin, (B) a curing agent, (C) a curing accelerator, (D) an inorganic filler and (E) a polycarbodiimide compound, and wherein: the curing agent (B) contains at least one amine-based curing agent; the curing accelerator (C) contains at least one capsule type curing accelerator; the inorganic filler (D) contains at least one flake-like inorganic filler; and the content of the inorganic filler (D) is 10-200 parts by mass relative to 100 parts by mass of the epoxy resin (A).

21 Claims, No Drawings

ONE-PACK TYPE ADHESIVE AND FUEL CELL SEPARATOR

TECHNICAL FIELD

The present invention relates to a one-part adhesive and a fuel cell separator.

BACKGROUND ART

Fuel cells are being developed by various manufacturers as a next-generation source of clean power. A fuel cell is constructed of several tens to several hundreds of stacked electrical generating units called cells. A coolant for cooling the system is generally supplied between the individual stacked cells.

A unit cell is constructed of a membrane electrode assembly (MEA in which a positive electrode and a negative electrode are arranged on either side of a polymer electrolyte membrane through which only hydrogen ions can pass, and also a separator disposed on the outside thereof. Hydrogen gas and oxygen gas are respectively fed to the two sides of the MEA, and the hydrogen ions that have passed through the polymer electrode membrane react with the oxygen, generating electricity and forming water.

An O-ring, rubber seal or the like is disposed on the outer periphery of the MEA in order to keep the hydrogen gas and oxygen gas from leaking out of the system, thereby preventing the oxygen gas and hydrogen gas from leaking out. Because there are cases in which an O-ring or a rubber seal is insufficient for preventing gases from leaking out and because of the need to precisely stack the cells on top of one another, two separators with a MEA therebetween, or a separator and a MEA, are sometimes bonded together and thereby integrally united. Moreover, in stacks of cells as well, given the need to precisely arrange these on top of one another, the stacks are sometimes bonded to each other in order to enhance the ease of assembly and reduce the number of man-hours. The adhesive used for such bonding is exposed to high-temperature, high-humidity conditions during power generation by the fuel cell and so is required to have high-temperature durability, resistance to moist heat and hot water resistance.

Also, in order to increase productivity, it is desired that the adhesive cure and manifest a bonding capability in a short time and that, when the adhesive is applied by screen printing, it have certain properties, including the absence of residual adhesive in mesh openings of the screen printing plate, clean transfer of the adhesive to the separator serving as the adherend during printing, and no ready loss of shape of the transferred adhesive. In addition, it is also desired that, when separators to which the adhesive has been applied are laminated together and cured under applied heat, ingredients within the adhesive do not bleed out and contaminate areas other than where the adhesive has been applied and that the content of impurities (ions, etc.) which promote corrosion and shorten the life of the fuel cell is low. Yet, separator adhesives which satisfy these properties do not yet exist.

PRIOR ART DOCUMENT

Patent Document

Patent Document JP-A 2012-199204

SUMMARY OF INVENTION

Technical Problem

It is therefore an object of this invention to provide an adhesive which has both an excellent productivity and a high reliability, particularly an adhesive that is suitable for bonding fuel cell separators.

Solution to Problem

The inventors have conducted extensive investigations in order to achieve this object. As a result, they have discovered that a one-part adhesive containing an epoxy resin as the base resin, a curing agent which includes an amine-type curing agent, a curing accelerator which includes a capsule-type curing accelerator, a flaky inorganic filler and, a polycarbodiimide compound possesses excellent printability in screen printing and the like, has excellent rapid curability, and moreover has an excellent resistance to moist heat. This discovery ultimately led to the present invention.

Accordingly, the invention provides the following one-part adhesive and the following fuel cell separator.

1. A one-part adhesive that contains (A) an epoxy resin, (B) a curing agent, (C) a curing accelerator, (D) an inorganic filler and (E) a polycarbodiimide compound, wherein the curing agent (B) includes at least one amine-type curing agent, the curing accelerator (C) includes at least one capsule-type curing accelerator, the inorganic filler (D) includes at least one flaky inorganic filler, and the content of the inorganic filler (D) is from 10 to 200 parts by weight per 100 parts by weight of the epoxy resin (A).
2. The one-part adhesive of 1. Therein the epoxy resin (A) is liquid at 10° C.
3. The one-part adhesive of 1 or 2, wherein the flaky inorganic filler accounts for 5 to 100 wt % of the inorganic filler (D).
4. The one-part adhesive of any of 1 to 3, wherein the inorganic filler (D) is of at least one type selected from the group consisting of talc, silica, mica and graphite.
5. The one-part adhesive of any of 1 to 4, wherein the amine-type curing agent is dicyandiamide or diaminodiphenylmethane.
6. The one-part adhesive of any of 1 to 5, wherein the capsule-type curing accelerator is a capsule-type imidazole.
7. The one-part adhesive of any of 1 to 6, wherein the curing accelerator (C) includes a capsule-type curing accelerator and an imidazole compound.
8. The one-part adhesive of any of 1 to 7, further containing (F) a coupling agent.
9. The one-part adhesive of 8, wherein the coupling agent (F) is a silane coupling agent.
10. An adhesive for fuel cell separators which includes the one-part adhesive of any of 1 to 9.
11. A fuel cell separator obtained by bonding a plurality of fuel cell separators using the fuel cell separator adhesive of 10.
12. A fuel cell separator/membrane electrode assembly monolith obtained by bonding a fuel cell separator with a membrane electrode assembly using the fuel cell separator adhesive of 10.
13. A fuel cell unit cell obtained by bonding a fuel cell separator to each of the two sides of a membrane electrode assembly using the fuel cell separator adhesive of 10.
14. A fuel cell unit cell obtained using the fuel cell separator adhesive of 10.

15. A fuel cell which includes the fuel cell separator of 11.
16. A fuel cell which includes the fuel cell separator/membrane electrode assembly monolith of 12.
17. A fuel cell which includes the fuel cell unit cell of 13 or 14.
18. A method for producing fuel cell separators, which method includes the steps of applying the fuel cell separator adhesive of 10 onto a portion of a first fuel cell separator, and bonding a second fuel cell separator to the first fuel cell separator.
19. A method for producing a fuel cell separator/membrane electrode assembly monolith, which method includes the steps of applying the fuel cell separator adhesive of 10 onto a portion of a fuel cell separator, and bonding thereto a membrane electrode assembly.
20. The fuel cell separator production method of 18 or 19, wherein the adhesive is applied by a screen printing process.
21. A method for producing a fuel cell unit cell, which method includes the step of bonding a fuel cell separator with a membrane electrode assembly using the fuel cell separator adhesive of 10.

Advantageous Effects of Invention

The one-part adhesive of the invention has an excellent productivity (particularly screen printability and rapid curability) and a high reliability, and is especially well-suited for use in bonding fuel cell separators.

DESCRIPTION OF EMBODIMENTS

[One-Part Adhesive]
The one-part adhesive of the invention includes (an epoxy resin, (B) a curing agent, (C) a curing accelerator which includes a capsule-type curing accelerator, (D) an inorganic filler which includes a flaky inorganic filler, and (E) a polycarbodiimide compound.
[(A) Epoxy Resin]
Epoxy resins commonly employed in the field of adhesives may be used as the epoxy resin serving as component (A). Examples of such epoxy resins include bisphenol A-type epoxy resins, bisphenol F-type epoxy resins, bisphenol S-type epoxy resins, phenolic novolak-type epoxy resins, glycidyl amine-type epoxy resins, cresol novolak-type epoxy resins, biphenyl-type epoxy resins, naphthalene-type epoxy resins, aliphatic epoxy resins, alicyclic epoxy resins, heterocyclic epoxy resins, spirocyclic epoxy resins and halogenated epoxy resins. Of these, bisphenol A-type epoxy resins and bisphenol F-type epoxy resins are preferred.

From the standpoint of the coating properties by screen printing or the like, the epoxy resin (A) is preferably liquid at 10° C. As used herein, "liquid" means to have flowability and is intended to encompass also pasty epoxy resins. Among epoxy resins having crystallinity, some solidify when left to stand for a long time at room temperature. Even such epoxy resins can be used, provided that they are liquid at 10° C. when cooled after being rendered liquid by heating.

The epoxy resin (A) may be of one type used alone, or two or more may be used in combination. When two or more epoxy resins are used together, use is possible provided that at least one epoxy resin is liquid at 10° C. and the mixture is liquid at 10° C. A liquid epoxy resin and a solid epoxy resin can both be used provided that, when mixed under heating, for example, the mixture is liquid when set to 10° C.

In order to increase the heat resistance, the epoxy resin (A) that is used may be one having a functionality of three or more. An example of such an epoxy resin is YH434L (from Nippon Steel & Sumikin Chemical Co., Ltd.).
[(B) Curing Agent]
The curing agent used as component (B) may be a cluing agent commonly employed with epoxy resins, although it must include at least one amine-type curing agent. Examples of other curing agents that may be used together with the amine-type curing agent include acid anhydride-type curing agents, phenolic curing agents, Lewis acid-type curing agents to and polymercaptan-type curing agents.

Illustrative examples of amine-type curing agents include aliphatic polyamines such as diethylenetriamine, triethylenetetramine and m-xylenediamine; aromatic polyamines such as diaminodiphenylmethane, m-phenylenediamine and diaminodiphenylsulfone; tertiary amine compounds such as diethylaminopropylamine and 2,4,6-tris(diaminomethyl)phenol; and polyamine compounds such as dicyandiamide, organic acid dihydrazides, amine adducts and polyamides. From the standpoint of latency (shelf stability as a one-part adhesive), high adhesiveness and enhanced productivity due to rapid curability, dicyandiamide and diaminodiphenylmethane are preferred.

Examples of acid anhydride-type curing agents include alicyclic acid anhydrides (liquid acid anhydrides) such as hexahydrophthalic anhydride and methyltetrahydrophthalic anhydride, and aromatic acid anhydrides such as trimellitic anhydride, pyromellitic anhydride and benzophenonetetracarboxylic acid. An example of a phenolic curing agent is phenolic resin. Examples of Lewis acid-type curing agents include Lewis acids such as boron trifluoride. Examples of polymercaptan-type curing agents include polysulfides, thioesters and thioethers.

The curing agent (B) may be of one type used alone, or two or more may be used in combination. When an amine-type curing agent is used together with another curing agent, it is preferable for the curing agent (B) to have an amine-type curing agent content of at least 50 wt %.

The curing agent (B) may be a capsule-type curing agent, "Capsule-type curing agent" refers here to a curing agent obtained by coating and thereby microencapsulating the above curing agent with a shell composed of urethane resin or the like. Commercial products may be used as the capsule-type curing agent.

The content of the curing agent (B) in the adhesive of the invention is an amount corresponding to preferably 0.5 to 1.2 equivalents, and more preferably 0.7 to 1.1 equivalents, based on the epoxy groups in the epoxy resin (A). Specifically, although dependent also on the epoxy equivalent weight of the epoxy resin, the content of the curing agent (B) per 100 parts by weight of the epoxy resin (A) is in from about 3 to about 50 parts by weight, and more preferably from about 5 to about 30 parts by weight at a curing agent (B) content within this range, the properties required of the inventive adhesive can be fully obtained.
[(C) Curing Accelerator]
The curing accelerator serving as component (C) includes at least one type of capsule-type curing accelerator. A "capsule-type curing accelerator" refers to a curing accelerator that has been coated and thereby microencapsulated with a shell composed of urethane resin or the like. By dispersing and thereby masterbatching this in the epoxy resin (A), a one-part adhesive which possesses both a high shelf stability and a rapid curability even at low temperatures can be prepared. In this invention, from the standpoint of enhancing productivity, i.e., shortening the curing time of the adhesive, a capsule-type curing accelerator is used.

The capsule-type curing accelerator is exemplified by encapsulated amine-type curing accelerators such as imidazole compounds, tertiary amines and salts thereof; and encapsulated phosphorus-type curing accelerators such as triphenylphosphine. Specific examples of these are subsequently mentioned.

Commercial products may be used as such capsule-type curing accelerators. Specific examples include Novacure® HX3721, HX3722, HX3748, HX3741 and HX3921HP (Asahi Kasei Corporation). These may be used singly, or two or more may be used in combination.

The content of the capsule-type curing accelerator is preferably from 1 to 40 parts by weight, and more preferably from 50 to 20 parts by weight, per 100 parts by weight of the epoxy resin (A). At a capsule-type curing accelerator content in this range, contamination due to bleeding can be prevented and a faster cure can be achieved.

In addition to the above capsule-type curing accelerator, the curing accelerator (C) may also include another curing accelerator. The other curing accelerator is exemplified by unencapsulated curing accelerators, including the above-mentioned amine-based curing accelerators such as imidazole compounds, tertiary amines and salts thereof, and phosphorus-based curing accelerators.

Specific examples of the imidazole compounds include 2-methylimidazole, 2-undecylimidazole, 2-heptadecylimidazole, 1,2-dimethylimidazole, 2-ethyl-4-methylimidazole, 2-phenylimidazole, 2-phenyl-4-methylimidazole, 1-benzyl-2-methylimidazole, 1-benzyl-2-phenylimidazole, 1-cyanoethyl-2-methylimidazole, 1-cyanoethyl-2-undecylimidazole, 1-cyanoethyl-2-ethyl-4-methylimidazole 1-cyanoethyl-2-phenylimidazole, 1-cyanoethyl-2-undecylimidazolium trimellitate, 1-cyanoethyl-2-phenylimidazolium trimellitate, 2,4-diamino-6-[2'-methylimidazolyl-(1')]-ethyl-s-triazine, 2,4-diamino-6-[2'-undecylimidazolyl-(1')]-ethyl-s-triazine, 2,4-diamino-6-[2'-ethyl-4"-methylimidazolyl-(1')-ethyl-s-triazine, 2,4-diamino-6-[2'-methylimidazolyl-(1')]-ethyl-s-triazine isocyanuric acid adduct, 2-phenylimidazole isocyanur-a]benzimidazole, 1-dodecyl-2-methyl-3-benzyl-1H-imidazol-3-ium chloride, 2-phenyl-4,5-dihydroxymethylimidazole, 2-phenyl-4-methyl-5-hydroxymethylimidazole, 2,3-dihydro-1H-pyrrolo[1,2-a]benzimidazole, 2-methylimidazoline and 2-phenylimidazoline. These imidazole compounds may also be used as adducts of the imidazole compounds and an epoxy resin.

Of these other curing accelerators, from the standpoint of the balance between the shelf stability of the adhesive and the potential as a curing accelerator, 2,4-diamine-6-[2'-methylimidazolyl(1')]-ethyl-s-triazine (available as Curezol® 2MZ-A from Shikoku Chemicals Corporation) is preferred.

When another curing accelerator such as the aforementioned is concomitantly used, the content thereof is preferably from 0.1 to 10 parts by weight, and more preferably from 0.5 to 5 parts by weight, per 100 parts by weight of the epoxy resin. At a content of other curing accelerators in this range, contamination due to bleeding can be prevented and a faster cure can be achieved.

When a capsule-type curing accelerator and another curing accelerator are used together, the capsule-type curing accelerator preferably accounts for 50 to 99 wt. % of the curing accelerator (C).

[(D) Inorganic Filler]

The inorganic filler serving as component (D) imparts the adhesive with a suitable viscosity and thixotropic properties, increases the coating properties, particularly the screen printability, and also increases the mechanical strength of the adhesive.

The inorganic filler (D), from the standpoint of increasing the screen printability, includes at least one type of flaky inorganic filler. The use of a flaky inorganic filler has the advantageous effects of imparting suitable thixotropic properties to the adhesive and also, when screen printing the adhesive, leaving no adhesive behind in the mesh openings of the screen and suppressing a loss of shape by the adhesive that has been coated (printed) onto the adherend.

In the above flaky inorganic filler, the degree of flakiness can be expressed in terms of the aspect ratio. The aspect ratio refers here to a particle shape indicator expressed as the "average particle diameter/particle thickness," and is measured with, for example, a flow-type particle image analyzer. The flaky inorganic filler has an aspect ratio of preferably from 5 to 200, more preferably from 10 to 100, and even more preferably from 20 to 60.

The flaky inorganic filler has an average particle size of preferably from 0.1 to 100 µm more preferably from 1 to 50 µm, and even more preferably from 2 to 15 µm. At an average particle size within this range, the screen printability is good. In this invention, the average particle size refers to, the median diameter ($d_{50}$) value in particle size distribution measurement using a laser diffraction-type particle size analyzer. Specific examples of the material making up the flaky filler include talc, silica (fumed silica, precipitated silica, crystalline silica, fused silica, dolomite, silicic anhydride, hydrated silica, etc.), mica, graphite (synthetic and natural graphites), ground calcium carbonate, precipitated calcium carbonate, colloidal calcium carbonate, magnesium carbonate, clay, kaolin, aluminum hydroxide, alumina, barium sulfate, white carbon, fine E glass powder, titanium oxide, zirconia, silicon nitride, barium titanate, barium carbonate, diatomaceous earth and carbon black. Of these, talc, silica, mica and graphite (synthetic and natural graphite) are preferred, and mica is especially preferred. Commercial products may be used as these. For example, exemplary micas include Micromica MK-100, MK-200 and MK-300 (from Katakura & Co-op Agri Corporation). Exemplary silicas include i-Naflecs® (Nippon Sheet Glass Co., Ltd.) and Sunlovely® (from AGC Si-Tech Co., Ltd.). Exemplary graphites include CNP-7 and CNP-15 (from Ito Graphite Co., Ltd.), and BF-7A, BF-8D, BF-10D and BF-10A (from Shin-Etsu Kasei Kogyo Co., Ltd.).

The inorganic filler (D) may include an inorganic filler which is not flaky. In such a case, the shape of the non-flaky inorganic filler is not particularly limited so long as it is not flaky, and may be, for example, blocky, spherical, needle-like or amorphous. The material making up the non-flaky inorganic filler is exemplified by the same materials as those mentioned above for the flaky filler.

The average particle size of the non-flaky inorganic filler is not particularly limited so long as it does not detract from the advantageous effects of the invention. However, the average particle size is preferably in a range similar to that for the average particle size of the flaky inorganic filler.

The scaly inorganic filler is preferably included in an amount which accounts for 5 to 100 wt % of the inorganic filler (D).

The content of the inorganic filler (D) is from 10 to 200 parts by weight per 100 parts by weight of the epoxy resin (A). When the content of the inorganic filler (D) is less than 10 parts by weight, the adhesive lacks sufficient thixotropic properties, as a result of which adhesive may remain in the mesh openings of the screen during screen printing, or the adhesive that has been printed (coated) onto one adherend may end up running before this adherend is laminated with another adherend as a result of which areas other than the original coated sites may become contaminated with adhesive that has run. On the other hand, when the content exceeds 200 parts by weight, the viscosity of the adhesive becomes too high, compromising the handleability and the workability/coating properties. The content of the inorganic filler (D) is preferably from 30 to 150 parts by weight.

In cases where carbon particles (graphite or carbon black) are not used as the inorganic filler (D), the adhesive of the invention has a bright color. This is beneficial in that, when the adhesive is coated onto a black separator formed of carbonaceous particles and a binder resin, the adhesive-coated state is readily discernible by eye.

[(E) Polycarbodiimide Compound]

The polycarbodiimide compound serving as component (E) is a compound having carbodiimide groups (—N═C═N—), and has the effect of increasing the moist heat resistance of the inventive adhesive. The polycarbodiimide compound can be prepared by, for example, heating an organic polyisocyanate in the presence of a suitable catalyst and thereby carrying out decarboxylation.

The organic polyisocyanate which is the starting material for synthesis of the polycarbodiimide compound (E) is exemplified by aromatic polyisocyanates, aliphatic polyisocyanates and alicyclic polyisocyanates. Specific examples include 1,5-naphthalene diisocyanate, 4,4'-diphenylmethane diisocyanate, 4,4'-diphenyldimethylmethane diisocyanate, 1,3-phenylene diisocyanate, 1,4-phenylene diisocyanate, 2,4-tolylene diisocyanate, 2,6-tolylene diisocyanate, hexamethylene diisocyanate, cyclohexane-1,4-diisocyanate, xylylene diisocyanate, isophorone diisocyanate, dicyclohexylmethane-4,4'-diisocyanate, methylcyclohexane diisocyanate, tetramethylxylylene diisocyanate, 2,6-diisopropylphenyl isocyanate and 1,3,5-triisopropylbenzene-2,4-diisocyanate. These may be used singly, or two or more may be used in combination.

The decarboxylation/condensation reaction on the organic polyisocyanate proceeds in the presence of a carbodiimidization catalyst. The carbodiimidization catalyst used may be, for example, a phospholene oxide such as 1-phenyl-2-phospholene 1-oxide, 3-methyl-1-phenyl-2-phospholene 1-oxide, 1-ethyl-2-phospholene 1-oxide, 3-methyl-2-phospholene 1-oxide, and 3-phospholene isomers of these. Of these, from the standpoint of reactivity, 3-methyl-1-phenyl-2-phospholene 1-oxide is preferred.

The polycarbodiimide compound obtained from this organic polyisocyanate may have isocyanate groups at the ends thereof; or may be controlled to a suitable degree of polymerization using a compound (end-capping agent) which reacts with the isocyanate groups.

Examples of such end-capping agents include monoisocyanates such as phenyl isocyanate, tolyl isocyanate, dimethylphenyl isocyanate, cyclohexyl isocyanate, butyl isocyanate and naphthyl isocyanate.

Alternatively, the end-capping agent may be an aliphatic compound, an aromatic compound or an alicyclic compound. For example, use can be made of compounds having a —OH group, such as methanol, ethanol, phenol, cyclohexanol N-methylethanolamine, polyethylene glycol monomethyl ether and polypropylene glycol monomethyl ether; compounds having a ═NH group, such as diethylamine and dicyclohexylamine; compounds having a —NH$_2$ group, such as butylamine and cyclohexylamine; compounds having a —COOH group, such as propionic acid, benzoic acid and cyclohexanecarboxylic acid; compounds having a —SH group such as ethyl mercaptan, allyl mercaptan and thiophenol; and compounds having an epoxy group.

The polycarbodiimide compound (E) has a number-average molecular weight (Mn) of preferably from 500 to 8,000, and more preferably from 1,000 to 5,000. Mn in this range is preferable because the moist heat resistance and handleability of the polycarbodiimide compound are good. In this invention, the Mn is a polystyrene-equivalent measured value obtained by gel permeation chromatography (GPC).

The polycarbodiimide compound (F) is preferably liquid in the bulk state (solvent-free state). A commercial product may be used as the polycarbodiimide compound. Specific examples include Carbodilite® V-05 and V-02B (from Nisshinbo Chemical Inc.).

The content of the polycarbodiimide compound (E) is preferably from 0.5 to 10 parts by weight, and more preferably from 2 to 5 parts by weight, per 100 parts by weight of the epoxy resin (A). At a polycarbodiimide compound (E) content in this range, a sufficient moist heat resistance can be obtained.

[(F) Coupling Agent]

In addition to components (A) to (E), the one-part adhesive of the invention may also include a coupling agent as component (F). The coupling agent (F) increases the resin wettability of the inorganic filler and acts to increase the bonding strength of the adhesive. Exemplary coupling agents include silane coupling agents, titania coupling agents and aluminum chelate compounds.

Specific examples of silane coupling agents include epoxysilanes such as γ-glycidoxypropytrimethoxysilane, γ-glycidoxypropyltriethoxysilane and β-(3,4-epoxycyclohexyl)ethyltrimethoxysilane; aminosilanes such as γ-aminopropyltriethoxysilane, N-(β-aminoethyl)-γ-aminopropyltrimethoxysilane, N-(β-aminoethyl)-γ-aminopropylmethyldimethoxysilane, γ-aminopropyltrimethoxysilane and γ-ureidopropyltriethoxysilane; mercaptosilanes such as 3-mercaptopropyltrimethoxysilane; and vinylsilanes such as p-styryltimethoxysilane, vinyltrichlorosilane, vinyltris(β-methoxyethoxy)silane, vinyltrimethoxysilane, vinyltriethoxysilane and γ-methacryloxypropyltimethoxysilane. In addition, epoxy, amino and vinyl polymer-type silanes can be used. Epoxysilane, aminosilane and mercaptosilane are especially preferred. Specific examples of commercial products include KBM-403, KBE-903 and KBM-802 (from Shin-Etsu Chemical Co., Ltd.), and Z-6040, Z-6011 and Z-6062 (from Dow Corning Toray Co., Ltd.).

Specific examples of titanic coupling agents include isopropyltriisostearoyl titanate, isopropyltri(N-aminoethylaminoethyl) titanate, diisopropylbis(dioctylphosphate) titanate, tetraisopropylbis(dioctylphosphite) titanate, tetraoctylbis(ditridecylphosphite) titanate, tetra(2,2-diallyloxymethyl-1-butyl)bis(ditridecyl)phosphite titanate, bis(dioctylpyrophosphate)oxyacetate titanate and bis(dioctylpyrophosphate)ethylene titanate.

Examples of aluminum chelate compounds include the compounds that can be obtained by substituting some or all of the alkoxide goups in an aluminum alkoxide with a chelating, agent such as an alkyl acetoacetate or acetyl acetone. Specific examples include aluminum ethyl acetoacetate diisopropylate, aluminum tris(ethyl acetoacetate), aluminum tris(acetyl acetonate) and aluminum bis(ethyl acetoacetate) monoacetyl acetonate.

The method of using the coupling agent may entail carrying out surface treatment of the inorganic filler before-hand by a known method such as a wet method or a dry method. Alternatively, the coupling agent may be introduced together with the other organic and inorganic starting materials when they are introduced.

The content of the coupling agent (F) is preferably from 0.5 to 2 parts by weight per 100 parts by weight of the inorganic filler (D). Within this range, the advantageous effects of the coupling agent can be fully obtained.

[Other Ingredients]

The one-part liquid adhesive of the invention may optionally include colorants (e.g., carbon black, dyes, etc.), flame retardants, ion trapping agents, antifoaming agents and leveling agents within ranges that do not detract from the advantageous effects of the invention. In addition, the low-viscosity epoxy resins having one epoxy group per molecule that are called reactive diluents may also be used within a range that does not detract from the advantageous effects of the invention. In addition, the one-part liquid adhesive of the invention may include a solvent for adjusting the viscosity. However, when a solvent is included, it may vaporize, giving rise to gas leaks during curing of the resin, and so the adhesive is preferably in a solvent-free form.

[Method for Preparing One-Pan Adhesive]

The one-tart adhesive of the invention can be prepared by stirring/mixing the various above-described starting materials by a known method. Stirring/mixture can be carried out using various types of mixers such as a dissolver, homogenizer or homogenizing disperser, or using a kneader, roll mill, bead mill, planetary mixer, universal mixer, rotation/revolution-type agitator or planetary stirrer. After stirring/mixture, the adhesive may be deaerated under a vacuum.

With the application of strong shear forces to the flaky inorganic filler, the flaky state breaks down and a good screen printability may not be achieved. Hence, when mixing in this inorganic filler, it is preferable to use a planetary mixer, a universal mixer, a rotation/revolution-type agitator or a planetary stirrer.

Similarly, with the application of strong shear forces to the capsule-type curing accelerator, the capsules break down and the curing reaction may proceed during mixture. Hence, when mixing in a capsule-type curing accelerator, it is preferable to use a planetary mixer, a universal mixer, a rotation/revolution-type agitator or a planetary stirrer.

On the other hand, when mixing in ingredients other than a flaky inorganic filler and a capsule-type curing accelerator, it is preferable to use a roll mill or a bead mill in older to apply strong shear forces and effect uniform dispersion.

[Use of One-Part Adhesive]

The one-part adhesive of the invention is suitable as an adhesive for solid polymer fuel cells, and is especially suitable as an adhesive for fuel cell separators. The fuel cell separator is preferably a carbon separator. Carbon separators are obtained by molding a composition that includes a carbon material and a binder resin. Known carbon materials and binder resins may be used without particular limitation as the carbon material and the binder resin. Illustrative examples of the carbon material include graphite powders composed of natural gaphite or synthetic gaphite, coal-tar pitch, petroleum pitch, coke, activated carbon, glassy carbon, acetylene black and ketjen black. Illustrative examples of the binder resin include epoxy resins, phenolic resins, polyester resins, acrylic resins, melamine resins, polyamide resins, polyimide resins, polyamide-imide resins, polyetherimide resins, phenoxy resins, urea resins, melamine resins, silicone resins, vinyl ester resins, diallyl phthalate resins and benzoxazine resins.

[Fuel Cell Separator]

The fuel cell separator of the invention is produced using the above one-part adhesive. Specifically, a plurality of separators are produced by bonding using the one-pail adhesive. The method for producing the fuel cell separator of the invention is exemplified by a method which involves coating the one-part adhesive by any method onto a portion (e.g., the outer periphery) of a separator, stacking the separator together with another separator, press bonding, and bonding under applied heat.

The pressure applied when press bonding, is preferably from about 0.001 MPa to about 7 MPa, and more preferably from about 0.02 MPa to about 4 MPa. The heating temperature is preferably from about 130° C. to about 220° C., and more preferably from about 150° C. to about 200° C. The press bonding and heating time is preferably from about 0.5 minute to about 60 minutes, and more preferably from about 1 minute to about 30 minutes.

Examples of methods for applying the one-part adhesive of the invention include, without particular limitation, screen printing, use of a dispenser, roll coating, gravure printing and spray painting. From the standpoint of productivity, screen printing is preferred. During screen printing, the one-part adhesive of the invention can prevent adhesive from remaining behind on the screen plate and moreover enables high-speed printing. At this time, application such that the thickness of the adhesive layer becomes from 50 to 500 μm, is preferred, and application such that the thickness becomes from 100 to 400 μm is more preferred.

When bonding separators to each other using the one cart adhesive of the invention, the adhesive may be applied to a portion (e.g., the outer periphery) of the cooling side of each separator and the cooling sides of the separators bonded to each other, or the adhesive may be applied to a portion (e.g., the outer periphery) of the reaction side of each separator and the reaction sides of the separators bonded to each other. In cases where the adhesive is applied to the reaction side of each separator and the separators are bonded to each other, bonding may be effected after placing the MEA therebetween in such a way as to not come into contact with the portions of the separator to which adhesive has been applied.

[Fuel Cell Separator-MEA Monolith]

The one-part adhesive of the invention can be suitably used also to bond a separator with a MEA. For example, the one-part adhesive can be applied by any method to a portion (e.g., the outer periphery) of the separator, the separator stacked with a MFA, and the separator and MEA mutually press-bonded and bonded under applied heat. The method for applying adhesive and the press bonding and heating conditions at this time may be the same as described above for the method of bonding together two fuel cell separators. In this way, a fuel cell separator-MEA monolith in which a fuel cell separator and a MEA are bonded together using the inventive adhesive can be produced.

[Fuel Cell Unit Cell]

The fuel cell unit cell of the invention can be obtained by using the one-part adhesive to bond fuel cell separators to the two sides of a MEA. The method for doing this may involve, for example, applying the one-part adhesive by any method to the vicinity of the outer periphery on the separator sides that are to come into contact with the MEA, stacking the two separators with the MEA in between, press bonding, and bonding under applied heat. The method for applying adhesive and the press bonding and heating conditions at this time may be the same as described above for the method of bonding together two fuel cell separators.

EXAMPLES

Examples and Comparative Examples are given below by way of illustration, although the invention is not limited by these Examples. The reagents used in the Examples below were as follows.

(A) Epoxy Resin
(A-1) YD-8125: a bisphenol A-type epoxy resin (Nippon Steel & Sumikin Chemical Co., Ltd.)
(A-2) EPICLON® EXAS35LV: a bisphenol A/F mixed epoxy resin (DIC Corporation)
(A-3) YH434L: a glycidyl amine-type epoxy resin (Nippon Steel & Sumikin Chemical Co., Ltd.)
(A-4) EPICLON N740: a phenolic noyolak-type epoxy resin (DIC Corporation)
(B) Curing Agent
(B-1) jERCURE® DICY7: dicyandiamide (Mitsubishi Chemical Corporation)
(B-2) Diaminodiphenylmethane (Tokyo Chemical industry Co., Ltd.)
(B-3) EPICLON B-570H: methyltetrahydrophthalic anhydride (DIC Corporation)
(C) Curing Accelerator
(C-1) Curezol 2MZ-A: an imidazole-type curing accelerator (Shikoku Chemicals Corporation)
(C-2) Novacure HX3722: a capsule-type curing accelerator (Asahi Kasei Corporation)
(D) Inorganic Filler
(D-1) MK-100: mica from Katakura & Co-op Agri Corporation; average particle size, 5 μm; flaky; aspect ratio, 30 to 50)
(D-2) i-Naflecs®: silica (from Nippon Sheet Glass Co., Ltd.; average particle size, 10 μm; flaky; aspect ratio,
(D-3) BF-10A: graphite (from Shin-Etsu Kasei Kogyo Co., Ltd.; average particle size, 10 μm; flaky; aspect ratio 10)
(D-4) SA31: alumina powder (Nippon Light Metal Co., Ltd.; to average particle size, 5 μm; blocky)
(D-5) FB940: (Denka Co., Ltd.; average particle size, 15 μm; spherical)
(E) Polycarbodiimide
(E-1) Carbodilite V-05: a polycarbodiimide compound (Nisshinbo Chemical Inc.)
(F) Coupling Agent
(F-1) KBM403: an epoxy group-containing, silane coupling agent (Shin-Etsu Chemical Co., Ltd.)
(F-2) KBE-903: an amino group-containing silane coupling agent (Shin-Etsu Chemical Co., Ltd.)

Fabrication of Fuel Cell Separator Sample

A fuel cell separator composition was prepared by charging a Henschel mixer with 100 parts by weight of synthetic graphite powder (average particle size: particle size distribution $d_{50}$, 100 μm), 20.5 parts by weight of an o-cresol novolak-type epoxy resin (epoxy equivalent weight, 204 g/eq, ICI viscosity at 150° C., 0.65 Pa·s) and 10.5 parts by weight of a novolak-type phenolic resin (hydroxyl group equivalent weight, 103 g/eq; ICI viscosity at 150° C., 0.22 Pa·s) and 0.3 part by weight of 2-phenylimidazole as the binder ingredients, and 0.2 part by weight of carnauba wax as an internal mold release to agent; and mixing at 800 rpm for 3 minutes.

The resulting composition was charged into a 200 mm×200 mm mold for fabricating fuel cell separators, and was press-molded at a mold temperature of 185° C., a molding pressure of 30 MPa and a molding time of 30 seconds, thereby obtaining a fuel cell separator preform having on one side grooves intended to serve as gas flow channels.

Both sides of the resulting preform (the gas flow channel side and the opposite side) were subjected to surface roughening treatment by wet-blasting with using alumina abrasive grains (average particle size: particle size distribution ($d_{50}$, 6 μm) at a discharge pressure of 0.22 MPa, thereby giving a fuel cell separator sample.

[2] Preparation of Adhesive

Example 1

The following were coarsely mixed together and then passed through a three-roll mill: 70 parts by weight of epoxy resin (A-1), 30 parts by weight of epoxy resin (A-3) and 6 parts by weight of curing agent (B-1). To the resulting mixture were added 10 parts by weight of curing accelerator (C-2), 100 parts by weight of inorganic filler (D-1), 3 parts by weight of polycarbodiimide compound (E-1) and 1 part by weight of silane coupling agent (F-1), and mixing was carried out for 3 minutes using a planetary stirrer/deaerator (Mazerustar KK-400W from Kurabo Industries, Ltd.), thereby giving a light yellow-colored pasty adhesive.

Examples 2 to 8, Comparative Examples 1 to 6

Based on the formulations in Table 1 below, adhesives were prepared in the same way as in Example 1.

[3] Evaluation of Adhesive (1) Screen Printability

Using a screen printer (a semi-automatic screen printer from Seria Corporation) and an 80-mesh (openings, 210 μm) screen, the adhesives prepared in Examples 1 to 8 and Comparative Examples 1 to 6 were printed onto fuel cell separator samples (120 mm×120 mm) at a squeegee load of 30 kg and a squeegee speed of 50 mm/s, following which the presence or absence of residual adhesive in the mesh openings of the screen used was determined by visual examination.

The criteria for rating the screen printability were as follows.

G: No adhesive remains in mesh openings of screen after printing

N: Adhesive remains in mesh openings of screen after printing (2) Rapid Curability The adhesives prepared in Examples 1 to 8 and Comparative Examples 1 to 6 were heated for 1 minute at 180° C. within a dryer, following which they were removed from the dryer and, using a differential scanning calorimeter (DSC6200, from Seiko Instruments Inc.), the presence or absence of an exothermic peak at a temperature rise rate of 10° C./min was determined.

The criteria for rating the rapid curability were as follows.

G: No exothermic peak

N: Exothermic peak is present

An exothermic peak represents adhesive curing reactions, which indicates that curing under the 180° C./1 minute conditions was inadequate.

(3) Bleedability

The adhesives prepared in Examples 1 to 8 and Comparative Examples 1 to 6 were printed onto fuel cell separator samples (120 mm×120 mm) by the same method as that described above for evaluating the screen printability, following which the separator was placed on the printed surface of another separator and 30 minutes of heating was carried out at 150° C. under an applied load of 1 MPa in a dryer, thereby producing bonded separator samples. These were taken out of the dryer and visually examined for bleeding of the adhesive in the areas where adhesive was printed.

The criteria for rating the bleedability were as follows.
G: No bleedout of adhesive outside of areas where adhesive was printed
N: Adhesive bleedout observed outside of areas where adhesive was printed (4) Moist Heat Resistance The adhesives prepared in Examples 1 to 8 and Comparative Examples 1 to 6 were heated at 150° C. for 30 minutes in a dryer and completely cured, thereby giving samples of cured adhesive measuring 4 mm×18 mm×2 mm. The glass transition temperatures (Tg) of these cured adhesives were measured using a differential scanning calorimeter (DSC6200, from Seiko Instruments Inc.). Measurement of the glass transition temperature (Tg) was carried out at a temperature rise rate of 3° C./min while applying a tensile load straining the sample 10 μm at a frequency of 1 Hz. The temperature that gives the maximum value for the tan δ ratio between the two resulting elastic moduli (loss modulus, storage modulus), expressed as "loss modulus/storage modulus," was treated as the glass transition temperature (Tg). In addition, the cured adhesives were held under the following moist heat conditions.

N: The glass transition temperature (Tg) after immersion under at least one of Condition 1 and Condition 2 was less than 90° C.

(5) Gas Leakage Test (Room Temperature)

Air (0.1 MPa) was passed through the interior of the bonded portion of bonded separator samples fabricated in the same way as described above for evaluating bleedability, and the samples were checked for the presence or absence of air leaks.

The rating criteria for this gas leakage test (room temperature) were as follows.
G: No leakage of air
N: Air leakage occurred (6) Gas Leakage Test (Following Hot Water Immersion)

Bonded separator samples fabricated in the same way as described above for evaluating bleedability were immersed for 2,000 hours in hot (90° C.) water, following which 0.1 MPa air was passed through the interior of the bonded portion of the bonded separator samples and the samples were checked for the presence or absence of air leaks.

The rating criteria for this gas leakage test (following hot water immersion) were as follows.
G: No leakage of air
N: Air leakage occurred These evaluation results are presented in Table 1.

TABLE 1

| Ingredients (pbw) | | | Example | | | | | | | | Comparative Example | | | | | |
|---|---|---|---|---|---|---|---|---|---|---|---|---|---|---|---|---|
| | | | 1 | 2 | 3 | 4 | 5 | 6 | 7 | 8 | 1 | 2 | 3 | 4 | 5 | 6 |
| (A) Epoxy resin | A-1 | | 70 | 60 | 70 | | 85 | | 70 | 70 | | 70 | 70 | 80 | 70 | |
| | A-2 | | | 40 | | 80 | | 100 | | | 60 | | | | | 100 |
| | A-3 | | 30 | | 30 | | | | 30 | 30 | 40 | 30 | 30 | 20 | 30 | |
| | A-4 | | | | | 20 | 15 | | | | | | | | | |
| (B) Curing agent | B-1 | | 6 | 6 | | 8 | 10 | 6 | 6 | 6 | 6 | | 6 | 6 | 6 | 6 |
| | B-2 | | | | 25 | | | | | | | | | | | |
| | B-3 | | | | | | | | | | | 70 | | | | |
| (C) Curing accelerator | C-1 | | 3 | 1 | 1 | 5 | 3 | 3 | 3 | | 1 | 3 | 3 | | 3 | 3 |
| | C-2 | | 10 | 20 | 30 | 5 | 15 | 10 | 10 | 15 | 20 | 10 | 10 | | 10 | 10 |
| (D) Inorganic filler | D-1 | | 100 | 10 | 50 | 30 | | | 100 | | 100 | | 5 | 80 | | |
| | D-2 | | | | | | 80 | | | | | | | | | |
| | D-3 | | | | | | | 40 | 40 | | | | | | | 40 |
| | D-4 | | | 100 | | 80 | | | | | | | | | | |
| | D-5 | | | | 100 | | | | | | 100 | | | | | |
| (E) Polycarbodiimide | E-1 | | 3 | 2 | 5 | 2 | 2 | 3 | 3 | 3 | 3 | 3 | 3 | 3 | 3 | |
| (F) Coupling agent | F-1 | | 1 | 1 | 2 | | | | | 1 | 1 | 1 | 0.1 | 1 | 1 | |
| | F-2 | | | | | 1 | 1 | | | | | | | | | |
| Evaluation results | Screen printability | | G | G | G | G | G | G | G | G | N | G | N | G | N | G |
| | Rapid curability | | G | G | G | G | G | G | G | G | G | N | G | N | G | G |
| | Bleedability | | G | G | G | G | G | G | G | G | G | N | G | N | G | G |
| | Moist heat resistance | Initial Tg (° C.) | 185 | 157 | 191 | 179 | 173 | 146 | 181 | 173 | 193 | 171 | 183 | 166 | 187 | 144 |
| | | Tg (° C.) after Condition 1 | 158 | 114 | 170 | 148 | 139 | 112 | 151 | 143 | 162 | 108 | 152 | 110 | 153 | 83 |
| | | Tg (° C.) after Condition 2 | 167 | 120 | 178 | 157 | 147 | 125 | 160 | 151 | 169 | 115 | 163 | 115 | 161 | 88 |
| | | Rating | G | G | G | G | G | G | G | G | G | G | G | G | G | N |
| | Gas leakage test (initial) | | G | G | G | G | G | G | G | G | N | G | N | G | N | G |
| | Gas leakage test (following 2,000 hrs immersion) | | G | G | G | G | G | G | G | G | N | N | N | G | N | N |

Condition 1: 2,000 hours of immersion in hot (80° C.) water
Condition 2: 2,000 hours of immersion in a hot (80° C.) water/ethylene glycol mixture (mixing ratio, 1:1)

The criteria firm rating the moist heat resistance were as follows.

G: The glass transition temperature (Tg) after immersion under both Condition 1 and Condition 2 was at least 90° C.

The results in Table 1 demonstrate that this invention is able to provide one-part adhesives which have an excellent productivity (screen printability, rapid curability) and moist heat resistance and also have a high reliability, particularly one-part adhesives suitable for fuel cell separator bonding applications.

The invention claimed is:

1. A one-part adhesive comprising (A) an epoxy resin, (B) a curing agent, (C) a curing accelerator, (D) an inorganic filler and (E) a polycarbodiimide compound, wherein the curing agent (B) includes at least one amine-type curing agent, the curing accelerator (C) includes at least one capsule-type curing accelerator, the inorganic filler (D) includes at least one flaky inorganic filler, and the content of the inorganic filler (D) is from 10 to 200 parts by weight per 100 parts by weight of the epoxy resin (A).

2. The one-part adhesive of claim 1, wherein the epoxy resin (A) is liquid at 10° C.

3. The one-part adhesive of claim 1, wherein the flaky inorganic filler accounts for 5 to 100 wt % of the inorganic filler (D).

4. The one-part adhesive of claim 1, wherein the inorganic filler (D) is of at least one type selected from the group consisting of talc, silica, mica and graphite.

5. The one-part adhesive of claim 1, wherein the amine curing agent is dicyandiamide or diaminodiphenylmethane.

6. The one-part adhesive of claim 1, wherein the capsule curing accelerator is a capsule-type imidazole.

7. The one-part adhesive of claim 1, wherein the curing accelerator (C) includes a capsule curing accelerator and an imidazole compound.

8. The one-part adhesive of claim 1, further comprising (F) a coupling agent.

9. The one-part adhesive of claim 8, wherein the coupling agent (F) is a silane coupling agent.

10. An adhesive for fuel cell separators which comprises the one-part adhesive of claim 1.

11. A fuel cell separator obtained by bonding a plurality of fuel cell separators using the fuel cell separator adhesive of claim 10.

12. A fuel cell separator/membrane electrode assembly monolith obtained by bonding a fuel cell separator with a membrane electrode assembly using the fuel cell separator adhesive of claim 10.

13. A fuel cell unit cell obtained by bonding a fuel cell separator to each of the two sides of a membrane electrode assembly using the fuel cell separator adhesive of claim 10.

14. A fuel cell unit cell obtained using the fuel cell separator adhesive of claim 10.

15. A fuel cell comprising the fuel cell separator of claim 11.

16. A fuel cell comprising the fuel cell separator/membrane electrode assembly monolith of claim 12.

17. A fuel cell comprising the fuel cell unit cell of claim 13.

18. A method for producing fuel cell separators, comprising the steps of applying the fuel cell separator adhesive of claim 10 onto a portion of a first fuel cell separator, and bonding a second fuel cell separator to the first fuel cell separator.

19. A method for producing a fuel cell separator/membrane electrode assembly monolith, comprising the steps of applying the fuel cell separator adhesive of claim 10 onto a portion of a fuel cell separator, and bonding thereto a membrane electrode assembly.

20. The fuel cell separator production method of claim 18, wherein the adhesive is applied by a screen printing process.

21. A method for producing a fuel cell unit cell, comprising the step of bonding a fuel cell separator with a membrane electrode assembly using the fuel cell separator adhesive of claim 10.

* * * * *